Dec. 9, 1941.    A. B. BENNETT    2,265,469
BRAKING DEVICE
Filed April 9, 1941    2 Sheets-Sheet 1

Alfred B. Bennett
INVENTOR

BY *Victor J. Evans & Co.*
ATTORNEYS

Dec. 9, 1941. A. B. BENNETT 2,265,469
BRAKING DEVICE
Filed April 9, 1941 2 Sheets-Sheet 2

Alfred B. Bennett  INVENTOR
BY Victor J. Evans & Co.
ATTORNEYS

Patented Dec. 9, 1941

2,265,469

UNITED STATES PATENT OFFICE 2,265,469

BRAKING DEVICE

Alfred B. Bennett, St. Augustine, Fla.

Application April 9, 1941, Serial No. 387,733

9 Claims. (Cl. 188—125)

My invention relates to new and useful improvements in braking devices.

An important object of my invention is to provide a braking device that is automatic in its action and that may be readily applied to the subframe of a vehicle, which device includes oppositely extending draft bars having provision for coupling onto other vehicles for automatically operating the braking mechanism when pressure is applied thereto by the mentioned other vehicles.

Another object of my invention is the provision of a device of the above-mentioned character which is positive in its action to set the brakes when either or both of the draft bars are pushed and which is equally positive in its action to release the brakes when either or both of the draft bars are pulled.

Still another object of my invention is the provision of a device of the above-mentioned character which, while primarily adapted to be automatically operated by a second vehicle, may be adapted for use as a hand or foot operated mechanism.

Yet another object of my invention is the provision of a brake mechanism of the above-mentioned character that embodies a minimum number of parts to assure a simple and compact organization which may be easily applied to the subframe of the vehicle and which is unique in its construction to eliminate dragging or projecting parts liable to be contacted and bent or broken by a foreign object to render the mechanism inoperative.

Other objects and advantages of my invention will be apparent during the course of the following description.

Figure 1:
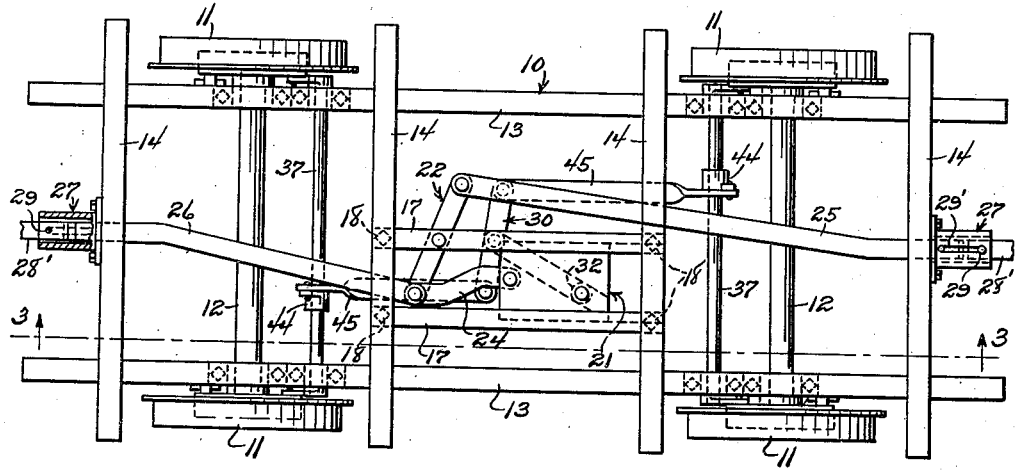
Figure 2:
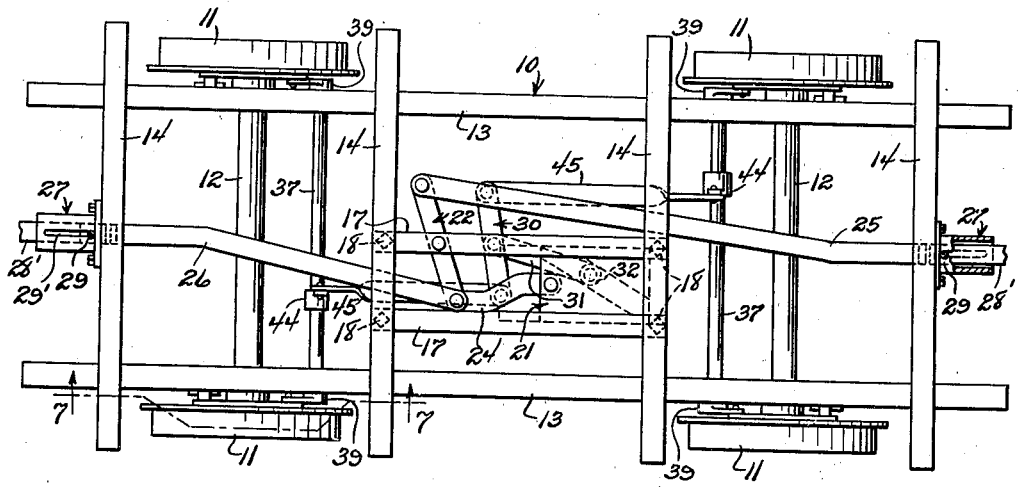
Figure 3:
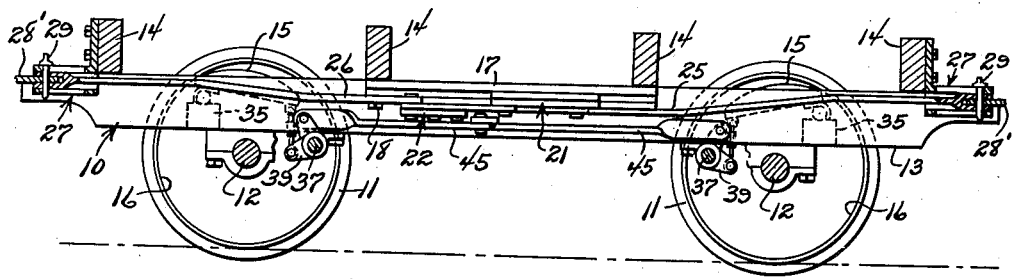
Figures 4, 6:
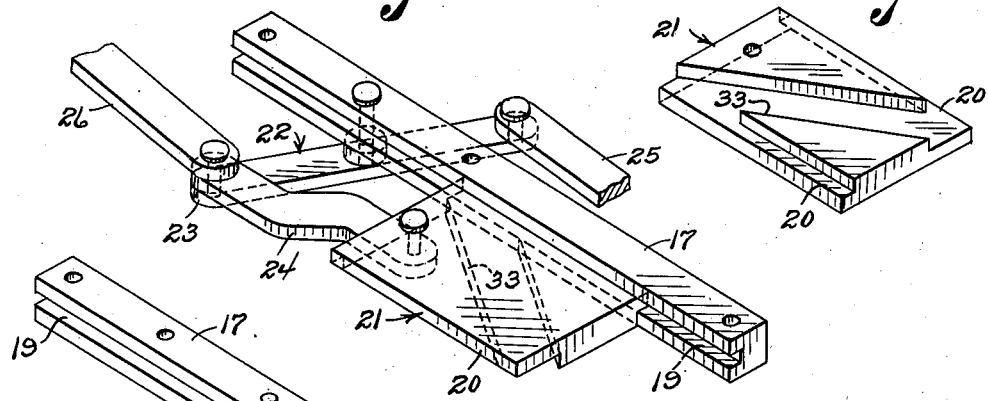
Figures 5, 7:
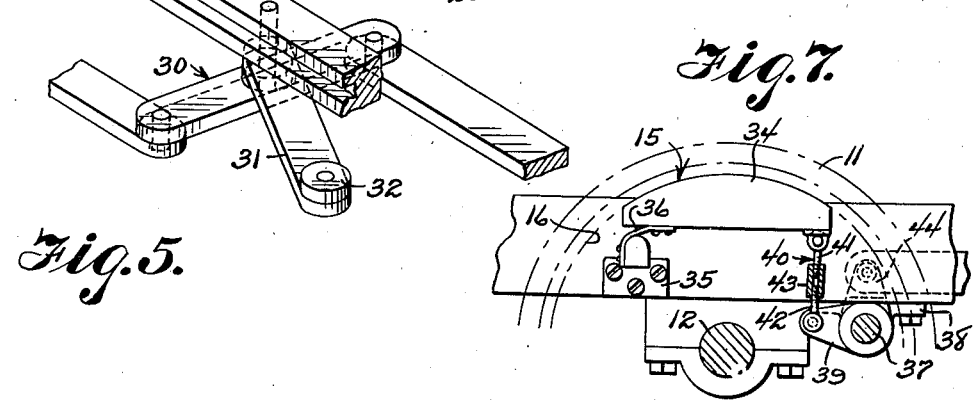

In the drawings, forming a part of this specification, and wherein like numerals are employed to designate like parts throughout the same, Figure 1 is a top plan view embodying my invention, showing the same applied to a railway car and with the parts disposed in the brake releasing position, Figure 2 is a view similar to Figure 1 but showing the parts positioned to apply the brakes, Figure 3 is a view taken on the line 3—3 of Figure 1, Figure 4 is a fragmentary perspective view of a part of the brake operating mechanism, Figure 5 is a fragmentary perspective view of another part of the brake mechanism, Figure 6 is a perspective view of a sliding block comprising a part of the invention, Figure 7 is a vertical sectional view taken on the line 7—7 of Figure 2, illustrating the manner in which the brake shoes are moved into and out of engagement with the wheels of the vehicle, and Figure 8 is a fragmentary perspective view of the means for coupling the car to another car.

In the accompanying drawings, wherein for the purpose of illustration, is shown a preferred embodiment of my invention, the numeral 10 designates the sub-frame of a vehicle, which vehicle is here illustrated as comprising a railway car and the frame is, therefore, supported by the flanged wheels 11 mounted for rotation on the extending ends of the axles 12. The frame is of standard construction including spaced longitudinal stringers 13 supported by the axles 12 and a plurality of transversely extending longitudinally spaced beams 14.

My invention is adapted to be mounted on the transverse beams 14 and to move the brake shoes 15 against the inner annular braking surface 16 of the wheels. With this end in view, I provide supports 17 which extend between the middle pair of transverse beams 14 and in slight spaced parallel relation with each other. The opposite ends of the supports are fixedly secured to the beams by means of the bolts 18, or the like, and the confronting edges thereof are provided with grooves 19 which receive the extending lateral flanges 20 of the sliding block 21. The block is securely held between the supports, but the engagement of the flanges 20 within the grooves is essentially loose to permit the block to be freely slidable for the entire length of the supports.

I have provided a draft operated means for positively shifting the block longitudinally of the frame, which means includes a lever 22 pivoted intermediate its ends to one of the supports 17. The end 23 of the lever terminates between the supports and a connecting link 24 is pivoted to the mentioned end and to the block whereby rocking of the lever about its pivot will effect shifting of the block within the grooves 19 and longitudinally of the frame. Obviously, if the lever is rocked in one direction, the block will be shifted toward one end of the frame and if the lever is rocked in the opposite direction the block will be shifted toward the opposite end of the frame. The inner ends of the draft bars 25 and 26 pivotally connect with the opposite ends of the lever 22 and the draft bars extend from the lever toward the opposite ends of the frame. The outer ends of the draft bars extend below the beams 14 and through aligning passages in the supporting brackets 27. The extremity of each of the draft bars extends beyond its respective end beam and is formed with a suitable yoke 28 which receives the coupling link 28' through the medium of which the same is coupled to another vehicle. A headed pin 29 extends through registering openings in the yoke and link and the extending ends thereof operate in elongated slots 29 in the supporting bracket. Obviously the pins will move to the rearward end of the slots when the car is being pushed to limit the rearward movement of the draft bars and they will move to the forward ends of the slots to limit the forward movement of the draft bars when the same are being pulled by the other vehicle.

A second lever or rocker arm 30 is pivoted at substantially its middle to the underside of the same support 17 carrying the lever 22 and the connecting link 31 is fixedly secured to the rocker arm at its point of pivotal connection with the support whereby the extending portion thereof projects below the block 21. The extremity of the link has a roller 32 mounted for rotation on its upper side which roller rides within a groove or guideway 33 formed in the underside of the block and extending diagonally of the longitudinal axis of the frame.

The manner in which the block is moved longitudinally of the frame between the supports 17 has already been described and it is now obvious that oscillation of the block in the described manner will cause the roller 32 to move back and forth in the guideway 33 to swing the rocker arm 30 back and forth about its pivot.

The swinging ends of the rocker arm are adapted to operate the brake shoes 15 which, as hereinbefore described, are adapted to be applied to the internal surface 16 of the wheels. Each of the wheels is provided with a separate braking unit and each unit includes a shoe 15 which comprises a solid metallic block having an arcuately curved outer edge 34 snugly fitting the surface 16 of the wheel. One end of the shoe is connected to a supporting bracket 35 mounted on the adjacent stringer 13 by a spring arm 36 which normally permits the shoe to be disengaged from the braking surface of the wheel, as best illustrated in Figure 3. A rod 37 extends transversely of the frame adjacent each pair of wheels and the opposite ends thereof are journalled for rotation in the bearings 38. The ends of the rods extend beyond the stringers but terminate short of the inner surfaces of the wheels and the rocker arms 39 fixedly mounted on the extending ends of the rods are connected to the swinging ends of the brake shoes by the adjustable connection 40. This connection, as best illustrated in Figure 7, comprises separate eye-bolts 41 and 42, the heads of which are pivotally connected to the shoe and rocker arm, respectively, and the threaded shanks of which are connected by an internally screw-threaded sleeve 43. One of the eye-bolts is provided with a right hand thread and the other of the eye-bolts is provided with a left hand thread whereby rotation of the sleeve in one direction will move the threaded shanks toward each other and rotation of the sleeve in the opposite direction will move the shanks away from each other to permit the connection to be adjusted to the proper length. A second rocker arm 44 is fixedly carried by each of the rods 37 intermediate the stringers 13 and the link bars 45 pivotally connect each of the arms 44 with a respective end of the rocker arm 30.

It may thus be seen that the swinging ends of the rocker arm 30 will simultaneously move the link bars 45 toward the outer end of the frame or away from the outer end of the frame in accordance with the direction of the pressure applied thereto. If the link bars are moved toward the ends of the frame the rocker arms 44 will rock the rod in a direction to lower the rocker arms 39, which, in turn, will move the swinging end of the shoes away from the braking surface 16 of the wheels. If, however, the link bars 45 are moved in a direction away from the ends of the frame the rocker arms 44 will rotate the rods 37 in a direction to raise the rocker arms 39 to move the arcuate edge 34 of the shoes into pressed frictional engagement with the braking surface 16 of the wheels.

In operation, the ends of the draft bars extending beyond the end beam 14 of the frame may be coupled to other cars or vehicles and it is the action of the cars to which the bars are connected that operates the above-described braking mechanism. If the car travelling in advance of the frame 10 is being pulled it will move the draft bar to which it is connected a maximum distance forwardly of the end beam 14, which distance will be reached when the headed coupling pin moves to the forward end of the slots 29. The interacting linkages will then be positioned in the manner illustrated in Figure 1. The end of the lever connected to the forwardly extending drawbar will be rocked forwardly and the end thereof connecting with the rearwardly extending drawbar will be rocked rearwardly to move the coupling pin of the last-mentioned drawbar to the outer end of the respective slots.

The link 24 connecting with the last-mentioned end of the lever 22 will retract the block 21 a maximum distance in a rearward direction and the roller 32 of the connecting link 31 will be advanced a maximum distance in the guideway 33 to rock the ends of the rocker arm 30 toward the ends of the frame. Movement of the rocker arm 30 in this manner will simultaneously lower the swinging ends of all of the brake shoes in the manner described to permit free movement of the wheels 11 along the track.

Let us assume that the brakes are applied to the car or vehicle pulling the frame 10. This action will be immediately transmitted to the connecting drawbar 25 which will be pushed rearwardly to rock the lever 22 about its pivot and to swing the opposite ends thereof in a direction away from the ends of the frame. The link 24 will shift the block 21 forwardly in the grooves 19 and the roller 32 of the connecting link 31 will move rearwardly in the guideway 33 to swing the rocker arm 30 about its pivot. The above operation will swing the ends of the rocker arm away from the ends of the frame and the link bars 45 will rotate the rods 37 to simultaneously raise the swinging end of the brake shoes 15. When the connections 40 are properly adjusted the outer edge 34 of the brake shoes will be tightly pressed against the surface 16 of the wheels whereby all of the wheels will be simultaneously braked to effect rapid stopping of the vehicle. It is obvious that this action will be, in turn, transmitted by the rearwardly extending drawbar 26 to the vehicle connected thereto and, if this vehicle is provided with a braking device similar to the one hereinabove-described, the brakes of the postjacent car will also be simultaneously applied. The greater the pressure exerted on the drawbar 25 by the preceding vehicle, the greater will be the pressure applied to the brake shoes and the greater will be the retarding action on all of the vehicles being towed. The shoes will remain in the braking position as long as pressure is applied to the drawbar 25; however, if the brakes of the preceding vehicle are released and the same is accelerated, both of the drawbars 25 and 26 will be immediately advanced a maximum distance to simultaneously release the brake shoes of each of the vehicles.

Thus the above action is automatically and instantly applied. It is not necessary to use springs or other parts which easily break or become defective and, in the event that the connections leading to one wheel or one set of wheels becomes broken or defective, the other connections will be in no wise affected to prevent braking of the vehicle when required. The entire assembly has been uniquely constructed to comprise a minimum number of parts thus materially reducing the possibility of broken or damaged parts.

If the vehicle is to be motor propelled or otherwise operated as a unit, the brakes may be applied from either end of the car by manually retracting either or both of the drawbars 25 and/or 26. The lever 22 may be made of sufficient length to provide sufficient leverage to easily permit the link 24 to operate the block 21 and, when the roller 32 has been positioned in the guideway to set the brakes, it will be securely locked in this position until the drawbars are released.

It is to be understood that the form of my invention, herewith shown and described, is to be taken as a preferred example of the same, and that various changes in the size, shape and arrangement of parts may be resorted to without departing from the spirit of my invention, or scope of the appended claims.

What is claimed is:

1. In combination with a truck frame having supporting wheels, an automatic brake mechanism comprising, a block mounted for sliding movement longitudinally of the frame and having a diagonally extending slot, draft actuated means for shifting the block longitudinally of the frame, brake shoes normally disengaged from the wheels, and actuator means operatively connected with the brake shoes and including a part riding in the transverse slot of the block, whereby pressure on the draft means will shift the block longitudinally of the frame to cause the part riding in the slot to swing transversely of the frame for driving the actuator to move the brake shoes into or out of engagement with the wheels.

2. In a truck frame having supporting wheels, an automatic brake mechanism comprising, a block slidable longitudinally of the frame having cam surfaces, a draft operated mechanism for shifting the block longitudinally of the frame, brake shoes operatively associated with the wheels, and a rocker arm operatively connected with the brake shoes and having a part engaging the cam surface, whereby pressure applied to the draft means will slide the block longitudinally of the frame and whereby movement of the cam surface will swing the rocker arm to move the brake shoes into or out of engagement with the wheels.

3. In combination with a truck frame having supporting wheels, an automatic brake mechanism comprising, a block movable longitudinally of the frame having a slot extending transversely of the frame, draft means for shifting the block longitudinally of the frame, a rocker arm pivoted to the frame having a part riding in the slot so that shifting of the block will rock the arm about its pivot, and brake shoes connected to the rocker arm for movement into or out of engagement with the wheels.

4. In combination with a truck frame having supporting wheels, an automatic brake mechanism comprising, a block mounted for sliding movement longitudinally of the frame having a groove extending diagonally of the frame, a pivoted lever, a link carried by the block connecting with the lever at one side of its pivot, draft bars connecting with the lever at opposite sides of its pivot, stop means carried by each of said draft bars for limiting movement of the bars when pressure is applied thereto in either direction, brake shoes movable into or out of engagement with the wheels, and a rocker arm operatively connected with the brake shoes and having a part received within the diagonal slot of the block, whereby pressure applied to the draft bars to move the same towards the end of the frame will shift the block longitudinally of the frame to effect movement of the mentioned part of the rocker arm within the slot to rock the arm about its pivot in a direction to move the brake shoes out of engagement with the wheels, and whereby pressure applied to the draft arms in the opposite direction will reversely shift the block to reversely move the rocker arm about its pivot to effect movement of the brake shoes into engagement with the wheels.

5. In combination with a truck frame having supporting wheels, an automatic brake mechanism comprising, a rocker arm pivoted to the frame, a block mounted for sliding movement longitudinally of the frame having cam surfaces engaged by parts of the rocker arm whereby shifting of the block will rock the arm about its pivot, brake shoes movable into or out of engagement with the wheels, and linkage connecting with the rocker arm and the brake shoes in a manner whereby shifting of the block to move the rocker arm in one direction will effect braking engagement of the shoes with the wheels and whereby shifting of the block to move the rocker arm in the opposite direction will disengage the shoes from the wheels.

6. In combination with a truck frame having supporting wheels, an automatic brake mechanism comprising, a rocker arm pivoted to the frame, a block mounted for sliding movement longitudinally of the frame having a cam surface engaged by parts of the rocker arm whereby shifting of the block will rock the arm about its pivot, brake shoes movable into or out of engagement with the wheels, linkage connecting the rocker arm and the brake shoes in a manner whereby shifting of the block to move the rocker arm in one direction will effect braking engagement of the shoes with the wheels and whereby shifting of the block to move the rocker arm in the opposite direction will disengage the shoes from the wheels, and draft actuated means connecting with the block for shifting the same longitudinally of the frame.

7. In combination with a truck frame having supporting wheels, an automatic brake mechanism comprising, a rocker arm pivoted to the frame, a block mounted for sliding movement longitudinally of the frame having cam surfaces engaged by parts of the rocker arm whereby shifting of the block will rock the arm about its pivot, brake shoes movable into or out of engagement with the wheels, linkage connecting the rocker arm and the brake shoes in a manner whereby shifting of the block to move the rocker arm in one direction will effect braking engagement of the shoes with the wheels and whereby shifting of the block to move the rocker arm in the opposite direction will disengage the shoes from the wheels, draft actuated means connecting with the block for shifting the same longitudinally of the frame, and stop means carried by the draft actuated means operative to limit shifting of the block in a direction to disengage the shoes from the wheels.

8. In combination with a truck frame having supporting wheels, an automatic brake mechanism comprising, a rocker arm pivoted to the frame, a block mounted for sliding movement longitudinally of the frame having cam surfaces engaged by parts of the rocker arm whereby shifting of the block will rock the arm about its pivot, brake shoes movable into or out of engagement with the wheels, linkage connecting the rocker arm and the brake shoes in a manner whereby shifting of the block to move the rocker arm in one direction will effect braking engagement of the shoes with the wheels and whereby shifting of the block to move the rocker arm in the opposite direction will disengage the shoes from the wheels, a lever pivoted intermediate its ends to the frame, a link carried by the block pivotally connecting with one end of the lever, and draft bars pivoted to the opposite ends of the lever and extending therefrom toward the opposite ends of the frame, whereby pressure applied to either or both of the draft bars will rock the lever about its pivot to shift the block longitudinally of the frame in accordance with the direction of the pressure applied to the draft bar.

9. In combination with a truck frame having supporting wheels, an automatic brake mechanism comprising a rocker arm pivoted to the frame, a block mounted for sliding movement longitudinally of the frame having cam surfaces engaged by parts of the rocker arm whereby shifting of the block will rock the arm about its pivot, brake shoes movable into or out of engagement with the wheels, linkage connecting the rocker arm and the brake shoes in a manner whereby shifting of the block to move the rocker arm in one direction will effect braking engagement of the shoes with the wheels and whereby shifting of the block to move the rocker arm in the opposite direction will disengage the shoes from the wheels, a lever pivoted intermediate its ends to the frame, a link carried by the block pivotally connecting with one end of the lever, draft bars pivoted to the opposite ends of the lever and extending therefrom toward the opposite ends of the frame, whereby pressure applied to either of the draft bars will rock the lever about its pivot to shift the block longitudinally of the frame in accordance with the direction of the pressure applied to the draft bar, and stop means carried by the bars for limiting longitudinal movement thereof relative to the frame.

ALFRED B. BENNETT.